United States Patent [19]
Hattori

[11] Patent Number: 5,226,862
[45] Date of Patent: Jul. 13, 1993

[54] MULTIPLE PLANETARY GEAR SYSTEM FOR MULTI-SPEED AUTOMATIC TRANSMISSION

[75] Inventor: Noboru Hattori, Yokosuka, Japan

[73] Assignee: Nissan Motor Co., Ltd., Japan

[21] Appl. No.: 848,900

[22] Filed: Mar. 10, 1992

[30] Foreign Application Priority Data

Mar. 14, 1991 [JP] Japan .................. 3-73682

[51] Int. Cl.⁵ .................. F16H 3/62; F16H 57/10
[52] U.S. Cl. .................. 475/286; 475/290; 475/319; 475/325
[58] Field of Search .......... 475/280, 286, 290, 311, 475/313, 317, 319, 323, 325

[56] References Cited

U.S. PATENT DOCUMENTS

| | | | |
|---|---|---|---|
| 3,812,739 | 5/1974 | Mori et al. | 475/285 |
| 3,996,817 | 12/1976 | Winzeler | 475/286 X |
| 4,263,822 | 4/1981 | Harmon | 475/280 X |
| 5,057,063 | 10/1991 | Asada et al. | 475/280 X |
| 5,069,656 | 12/1991 | Sherman | 475/280 X |
| 5,133,697 | 7/1992 | Hattori | 475/290 X |

FOREIGN PATENT DOCUMENTS

| | | | |
|---|---|---|---|
| 388209 | 9/1990 | European Pat. Off. | 475/323 |
| 52-77973 | 6/1977 | Japan | 475/286 |
| 2-35245 | 2/1990 | Japan | 475/280 |
| 2-76954 | 3/1990 | Japan | 475/290 |
| 2-154841 | 6/1990 | Japan | 475/280 |
| 2-168047 | 6/1990 | Japan | 475/280 |

Primary Examiner—Rodney H. Bonck
Assistant Examiner—David E. Henn
Attorney, Agent, or Firm—Lowe, Price, LeBlanc & Becker

[57] ABSTRACT

An improved planetary gear type transmission mechanism is provided which is capable of realizing a plurality of desired speed ratios in a wide range, for example in an automatic transmission, and which maintains gear ratios of all of a plurality of planetary gear sets in an available range. The transmission mechanism includes a double pinion type planetary gear set.

2 Claims, 12 Drawing Sheets

FIG_1
PRIOR ART

FIG_2 PRIOR ART

FIG_5

FIG_7

FIG_8

FIG_9

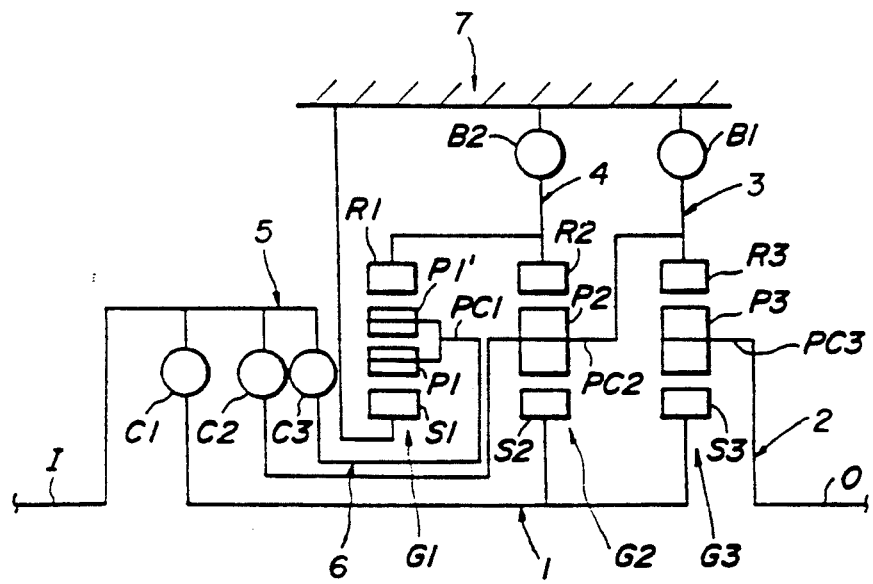
FIG_11

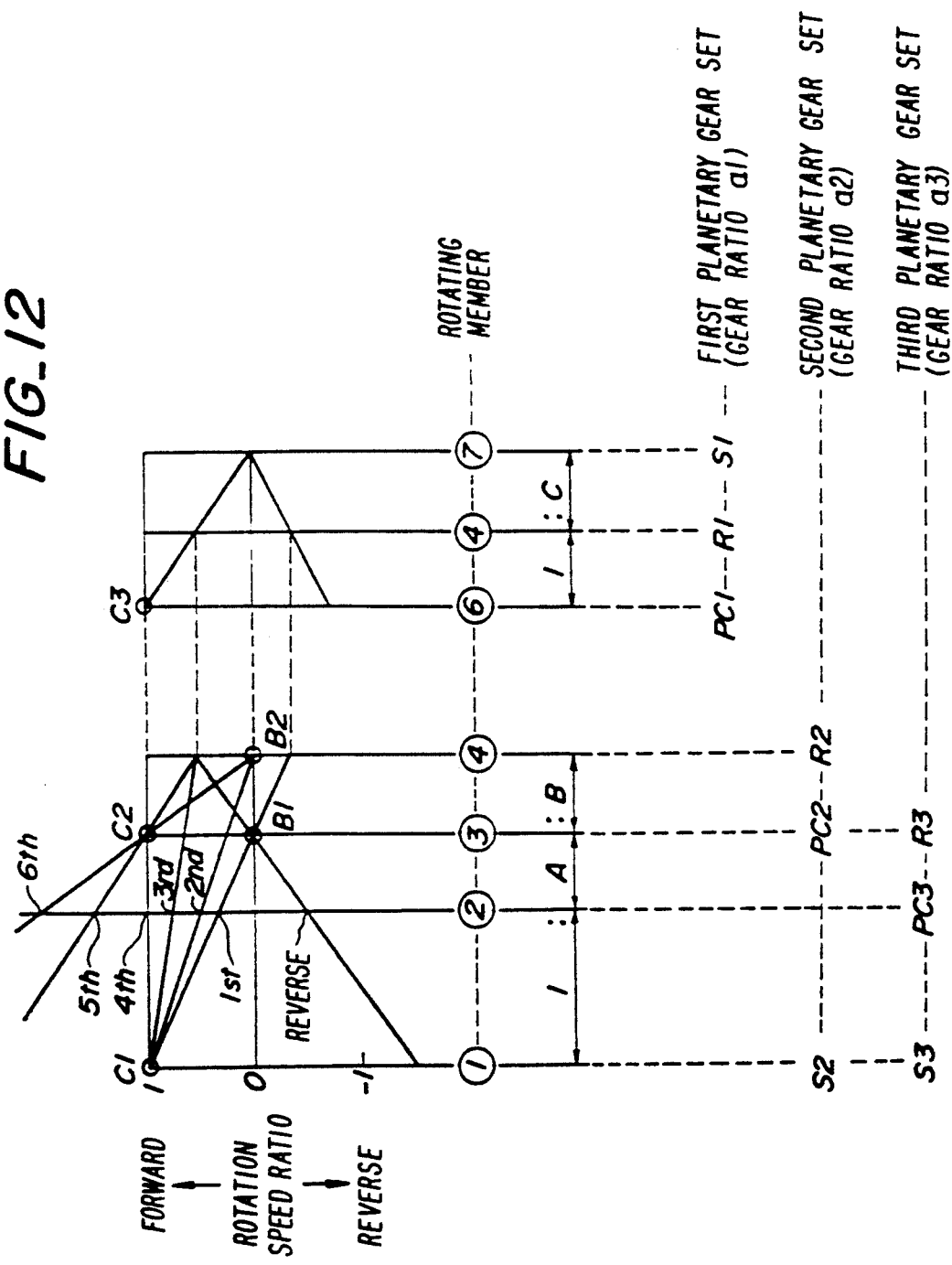

MULTIPLE PLANETARY GEAR SYSTEM FOR MULTI-SPEED AUTOMATIC TRANSMISSION

BACKGROUND OF THE INVENTION

1. Field of the Invention

The present invention relates to a planetary gear type transmission mechanism, for example, for an automatic transmission, which can provide greater freedom in selection of speed ratios in designing a multi-speed-ratio automatic transmission.

2. Description of the Related Art

Japanese Patent Application Laid Open No. 52-149562 discloses a planetary gear type transmission mechanism. FIG. 1 shows the construction of the conventional planetary gear type transmission mechanism disclosed in the above-mentioned publication. As shown in FIG. 1 the disclosed planetary gear type transmission mechanism includes first, second and third planetary gear sets G1, G2 and G3 interposed coaxially between an input shaft I and an output shaft O. Each of the first planetary gear set G1 near the input shaft I, the third planetary gear set G3 near the output shaft O, and the second planetary gear set G2 therebetween is a single pinion type planetary gear set, which comprises a sun gear S1, S2 and S3, an internal ring gear R1, R2 and R3, a planet pinion P1, P2 and P3 meshing with the corresponding internal ring gear and the corresponding sun gear, and a pinion carrier PC1, PC2 and PC3 rotatably supporting the corresponding planet pinions. The sun gears S2 and S3 of the second and third planetary gear sets G2 and G3 are integrally coupled with each other to form a first rotating member 1. The first rotating member is connectable with the input shaft I through a first clutch C1. The pinion carrier PC3 of the third planetary gear set G3 is integrally coupled with the output shaft O to form a second rotating member 2. The pinion carrier PC2 of the second planetary gear set G2 and the internal ring gear R3 of the third planetary gear set G3 are integrally coupled with each other to form a third rotating member 3. The third rotating member 3 is able to be fixed to a transmission casing 7 by means of a first brake B1 and is also connectable with the input shaft I through a second clutch C2. The pinion carrier PC1 of the first planetary gear set G1 and the internal ring gear R2 of the second planetary gear set G2 are integrally coupled with each other to form a fourth rotating member 4 which is adapted to be fixed on the transmission casing 7 by means of a second brake B2. The sun gear S1 of the first planetary gear set G1 is integrally coupled with the input shaft I to form a fifth rotating member 5. The internal ring gear R1 of the first planetary gear set G1 forms a sixth rotating member 6 and is able to be fixed on the transmission casing as a seventh rotating member 7 by means of a third brake B3.

The alignment chart showing relationships among rotation speed ratios of the rotating members in the foregoing construction of the transmission mechanism is illustrated in FIG. 2. In FIG. 2, the positions 1 to 4 on the horizontal axis show relative positions of the first to fourth rotating members determined corresponding to the set gear ratios (ratio of gear teeth number of the sun gear versus gear teeth number of the internal ring gear) and positions 5, 4, 6 show relative position of the fifth, fourth and sixth rotating member determined corresponding to the set gear ratios. Vertical axes extending across the points ①  to ④ and ⑤, ④, ⑥ represent rotation speed ratio of the relevant rotating members (ratio of rotation speed of the rotating member versus the rotation speed of the input shaft). Both alignment charts of the first to fourth rotating members 1 to 4 and of the fifth, fourth and sixth rotating members 5, 4, 6, are illustrated on the same figure. The rotation speed ratio 0 represents a state in which the relevant rotating member is fixed, 1 represents the state in which the relevant rotating member rotates in the same direction as the input shaft I (forward direction) at the same speed as that of the input shaft, and −1 represents the state in which the relevant rotating member rotates in the opposite direction to the input shaft (reverse direction) at the same speed as that of the input shaft. As shown in FIG. 2, the disclosed planetary gear type transmission mechanism establishes six forward speed ratios and a single reverse speed ratio by engaging two friction elements of the clutches C1, C2 and the brakes B1, B2, B3 to limit rotation of the corresponding rotating members. If a rate of the distances between 1 and 2, 2 and 3, and ③ and ④ is expressed as 1:A:B, and a rate of distances between 5 and 4, and 4 and 6 is expressed as 1:C, the gear ratios $\alpha_1$, $\alpha_2$ and $\alpha_3$ (ratio of gear teeth number of the sun gear versus gear teeth number of the internal ring gear) of the first, second and third planetary gear sets G1, G2 and G3 can be expressed respectively by:

$$\alpha_1 = C \tag{1}$$

$$\alpha_2 = B \div (1 + A) \tag{2}$$

$$\alpha_3 = A \tag{3}$$

The following Table 1 represents the relationships between the friction elements to be engaged (refer to "○" marks) and the gear positions established thereby as well as the speed ratios at respective gear positions.

TABLE 1

| Gear position | \multicolumn{5}{c}{Friction element} | Speed ratio |
| --- | --- | --- | --- | --- | --- | --- |
|  | C1 | C2 | B1 | B2 | B3 |  |
| Forward |  |  |  |  |  |  |
| 1st | ○ |  |  |  | ○ | $1 + \frac{1}{A}$ |
| 2nd | ○ |  |  | ○ |  | $1 + \frac{1}{A + B}$ |
| 3rd | ○ |  |  |  | ○ | $\frac{(1 + A + B) - (1 + C)}{C + (A + B) - (1 + C)}$ |
| 4th | ○ | ○ |  |  |  | 1 |
| 5th |  | ○ |  |  | ○ | $\frac{B(1 + C)}{A + B(1 + C)}$ |
| 6th |  | ○ |  | ○ |  | $\frac{B}{A + B}$ |
| Reverse |  |  | ○ |  | ○ | $-\frac{B(1 + C)}{AC}$ |

In the prior art set forth above, respective speed ratios other than the speed ratio at the fourth gear position (speed ratio=1) are determined by the three parameters A, B and are C and correlated to each other. This makes it impossible to determine the speed ratio at each gear position independently of other gear positions. Therefore, although desired speed ratios can be realized as one likes in the alignment chart, by determining the parameters A, B and C to make speed ratios near the desired values, the transmission mechanism of the desired speed ratios is difficult to realize according to desired speed ratios in the practical implementation, since it is known to those skilled in the art that unless the gear ratios $\alpha_1$, $\alpha_2$ and $\alpha_3$ of the planetary gear sets G1, G2 and G3 determined by the parameters A, B and C are maintained within a predetermined range, the transmission mechanism cannot be applied for practical use. In practice, the preferred range of gear ratios of a planetary gear set is 0.35 to 0.6. If the gear ratio exceeds 0.6, due to an upper limitation of the size of the automatic transmission casing the diameter of the planet pinion becomes unacceptable small, which requires that the planet pinion must be rotated at a high speed, and the size of the gear teeth thereof become unacceptably small and potentially lower durability of the planetary gear set to an unacceptable level for practical use. On the other hand, when the gear ratio becomes less than 0.35, because of restrictions on the size of the transmission casing, the diameter of the sun gear tends to become excessively small and may cause lack of strength of a shaft extending through the sun gear.

In the practical example, when the automatic transmission is designed with parameters A=0.420, B=0.682 and C=0.887, to establish the following speed ratios: first gear position=3.38, second gear position=1.91, third gear position=1.34, fourth gear position=1.00, fifth gear position=0.75, sixth gear position=0.62, and reverse gear position=−3.45, the gear ratios calculated from said expressions (1) to (3) become $\alpha_1=0.887$, $\alpha_2=0.48$ and $\alpha_3=0.42$. In this example, the gear ratio $\alpha_1$ exceeds the above-mentioned preferred range. Therefore, the speed ratio sought in this example cannot be realized.

Another type of a planetary gear type transmission mechanism is also well-known, as shown in FIG. 3. This prior art differs from the prior art in FIG. 1 in the following points. The third brake B3 in FIG. 1 as the friction element for fixing and releasing the internal ring gear R1 as the sixth rotating member to and from the transmission casing as the seventh rotating member is deleted, and in FIG. 3 the internal ring gear R1 is integrally coupled with the transmission casing as the seventh rotating member 7. In FIG. 3, moreover, the input shaft I forms the fifth rotating member 5 by itself and the sun gear S1 forms the sixth rotating member 6 by itself, between which rotating members 5 and 6 is provided a third clutch C3 as a friction element for connecting and disconnecting these rotating members 5 and 6.

In this arrangement in FIG. 3, as shown in FIG. 4 the alignment chart showing relationships among rotation speed ratios of the rotating members is same as that shown in FIG. 2 of the prior art in FIG. 1. Therefore, as shown in the following Table 2 representing the relationship between the friction elements to be engaged (refer to "○" marks) and the gear positions established thereby, the prior art in FIG. 3 also establishes speed ratios at each gear position similar to those of the first prior art in FIG. 1.

TABLE 2

| Gear position | C1 | C2 | C3 | B1 | B2 | Speed ratio |
|---|---|---|---|---|---|---|
| Forward | | | | | | |

TABLE 2-continued

| Gear position | C1 | C2 | C3 | B1 | B2 | Speed ratio |
|---|---|---|---|---|---|---|
| 1st | ○ | | | | ○ | $1 + \frac{1}{A}$ |
| 2nd | ○ | | | | ○ | $1 + \frac{1}{A+B}$ |
| 3rd | ○ | | ○ | | | $\frac{(1+A+B)(1+C)}{C+(A+B)(1+C)}$ |
| 4th | ○ | ○ | | | | 1 |
| 5th | | ○ | ○ | | | $\frac{B(1+C)}{A+B(1+C)}$ |
| 6th | | ○ | | | ○ | $\frac{B}{A+B}$ |
| Reverse | | | ○ | ○ | | $-\frac{B(1+C)}{AC}$ |

In the prior art in FIG. 3, if a rate of distances between 1 and 2, 2 and 3, and 3 and 4 is expressed as 1:A:B, and a rate of distances between 6 and 4, and 4 and 7 is expressed as 1:C, the gear ratios $\alpha_1$, $\alpha_2$ and $\alpha_3$ (ratio of gear teeth number of the sun gear versus gear teeth number of the internal ring gear) of the first, second and third planetary gear sets G1, G2 and G3 can be expressed respectively by:

$$\alpha_1 = C \tag{1}$$

$$\alpha_2 = B \div (1+A) \tag{2}$$

$$\alpha_3 = A \tag{3}$$

and these gear ratios $\alpha_1$, $\alpha_2$ and $\alpha_3$ are similar to the prior art in FIG. 3.

When the values given for the example of FIG. 1 are also applied to the prior art in FIG. 3, the gear ratios $\alpha_1$, $\alpha_2$ and $\alpha_3$ respectively become 0.887, 0.48 and 0.42. Therefore, similarly to the example of FIG. 1, the gear ratio $\alpha_1$ of the first planetary gear set G1 goes out of the preferred range (0.35 to 0.6) and the same drawback as that in the example of FIG. 1 is caused.

SUMMARY OF THE INVENTION

Therefore, it is an object of the present invention to solve the above-identified and related problems in the prior art.

Another object of the invention is to provide a planetary gear type transmission mechanism employing a double pinion type planetary gear set to make it easier to obtain desired speed ratios in a wide range while maintaining the gear ratios within a predetermined range.

In order to accomplish these and other related objects in a preferred embodiment of the present invention there is provided an improved planetary gear type transmission mechanism, for example, for an automatic transmission comprising:

an input shaft, an output shaft, planetary gear sets interposed coaxially between the input and output shafts respectively and adapted to provide a plurality of speed ratios therebetween, and friction elements selectively operative to establish said plurality of speed ratios, the improvement comprising:

a first planetary gear set near the input shaft of a double pinion type construction, including a first sun gear, a first internal ring gear, a pair of first planet pinions and a first pinion carrier;

a second planetary gear set of a single pinion type construction, including a second sun gear, a second internal ring gear, a second planet pinion and a second pinion carrier; and a third planetary gear set near the output shaft is also of a single pinion type construction, including a third sun gear, a third internal ring gear, a third planet pinion and a third pinion carrier;

wherein said first, second and third planetary gear sets cooperate so as to provide a first member with said second sun gear and said third sun gear integrally coupled with each other, a second member with said output shaft and said third pinion carrier rigidly fixed thereto, a third member with said second pinion carrier and said third internal ring gear integrally coupled with each other, a fourth member with said first internal ring gear and said second internal ring gear integrally coupled with each other, a fifth member with said input shaft and said first sun gear rigidly fixed thereto, a sixth member with said first pinion carrier, and a seventh member with a transmission casing, and said friction elements include a first friction element selectively connecting and disconnecting said first member and said fifth rotating member, a second friction element selectively fixing and releasing said third member to and from said seventh rotating member, a third friction element selectively connecting and disconnecting said third member and said fifth member, a fourth friction element selectively fixing and releasing said fourth member to and from said seventh rotating member, and a fifth friction element selectively fixing and releasing said sixth member to and from said seventh member.

According to another aspect of the invention, a planetary gear type transmission mechanism is provided in which differ from the planetary gear type transmission mechanism as set forth in the following points. The fifth member is formed by the first pinion carrier in place of the first sun gear integrally coupled with the input shaft. The sixth member to be fixed and released to and from the seventh member by means of the fifth friction element is formed by the first sun gear in place of the first pinion carrier.

In a further aspect of the invention there is provided a planetary gear type transmission mechanism, for example for an automatic transmission, comprising an input shaft, an output shaft, planetary gear sets interposed coaxially between the input and output shafts respectively and adapted to provide a plurality of speed ratios therebetween, and friction elements selectively operative to establish said plurality of speed ratios, the improvement comprising a first planetary gear set near the input shaft of a double pinion type construction, including a first sun gear, a first internal ring gear, a pair of first planet pinions and a fixed first pinion carrier;

a second planetary gear set of a single pinion type construction, including a second sun gear, a second internal ring gear, a second planet pinion and a second pinion carrier;

a third planetary gear set near the output shaft also of a single pinion type construction, including a third sun gear, a third internal ring gear, a third planet pinion and a third pinion carrier;

said first, second and third planetary gear sets cooperating so as to form a first member with said second sun gear and said third sun gear integrally coupled with each other;

a second member with said output shaft and said third pinion carrier rigidly fixed thereto;

a third member with said second pinion carrier and said third internal ring gear integrally coupled with each other;

a fourth member with said first internal ring gear and said second internal ring gear integrally coupled with each other;

a fifth member with said input shaft;

a sixth member with said first sun gear; and a seventh member with a transmission casing;

and said friction elements include a first friction element selectively connecting and disconnecting said first member and said fifth member:

a second friction element selectively fixing and releasing said third member to and from said seventh rotating member;

a third friction element selectively connecting and disconnecting said third member and said fifth member;

a fourth friction element selectively fixing and releasing said fourth rotating member to and from said seventh member; and a fifth friction element selectively connecting and disconnecting said fifth member and said sixth member.

According to yet another aspect of the invention, a planetary gear type transmission mechanism is provided which differs from the planetary gear type transmission mechanism as set above in the following points. The first sun gear in place of the first pinion carrier is integrally coupled with the transmission casing as the seventh member. The first pinion carrier in place of the first sun gear is the sixth member, which is connected and disconnected to the fifth member by means of the fifth friction element.

BRIEF DESCRIPTION OF THE DRAWINGS

FIG. 11 is a schematic diagram showing the fourth embodiment of a planetary gear type transmission mechanism according to the invention; and FIG. 12 an alignment chart showing relationship among rotation speed ratios of various rotating members of the transmission mechanism in FIG. 11.

DESCRIPTION OF THE PREFERRED EMBODIMENTS

Figure 5:
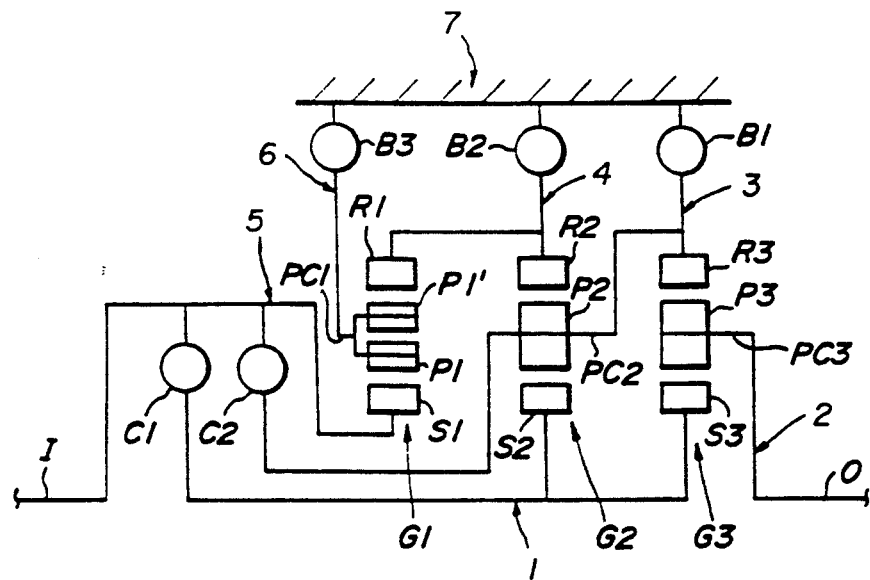
FIG. 5 is a schematic diagram showing the first embodiment of a planetary gear type transmission mechanism according to the invention.

Referring now to the drawings, FIG. 5 is a schematic diagram of the first embodiment of a planetary gear type transmission mechanism according to the invention. In FIG. 5, the elements and members similar to those in the foregoing conventional construction of the prior art planetary gear type transmission mechanism per FIG. 1 will be represented by the same reference numerals and the same symbols. The first embodiment of the planetary gear type transmission mechanism includes a first planetary gear set G1, a second planetary gear set G2 and a third planetary gear set G3 interposed coaxially between an input shaft I and an output shaft O. The first planetary gear set G1 near the input shaft I is constructed as a double pinion type planetary gear set. Therefore, it includes a sun gear S1, an internal ring gear R1, a pair of planet pinions P1 and P1' which are respectively meshed with the sun gear S1 and the internal ring gear R1 and mutually meshed with each other, and a pinion carrier PC1 rotatably supporting all of the planet pinions. The second and third planetary gear sets G2 and G3 are also each constructed as single pinion type planetary gear sets. Each of the second and third planetary gear sets G2 and G3 thus includes a sun gear S2, S3, an internal ring gear R2, R3, a planet pinion P2, P3 meshing with the associated sun gear and internal ring gear, and a pinion carrier PC2, PC3 rotatably supporting the associated planet pinion.

The sun gears S2 and S3 are integrally coupled with each other to form a first rotating member 1. The first rotating member 1 is connectable with the input shaft I by means of a first clutch C1 which serves as a first friction element. The pinion carrier PC3 is rigidly connected with the output shaft O to form a second rotating member 2. The pinion carrier PC2 and the internal ring gear R3 are integrally coupled with each other to form a third rotating member 3. The third rotating member 3 can be selectively fixed onto a transmission casing by means of a first brake B1 as a second friction element. On the other hand, the third rotating member 3 is connectable with the input shaft I by means of a second clutch C2 serving as a third friction element. The internal ring gears R1 and R2 are coupled with each other to form a fourth rotating member 4. The fourth rotating member 4 can be selectively fixed onto the transmission casing by means of a second brake B2 as a fourth friction element. The sun gear S1 is rigidly connected to the input shaft I to serve as a fifth rotating member 5. The pinion carrier PC1 serves as a sixth rotating member 6 which can be selectively fixed onto the transmission casing by means of a third brake B3. The third brake B3 serves as a fifth friction element and the transmission casing forms seventh member 7 normally fixed.

Figure 1:
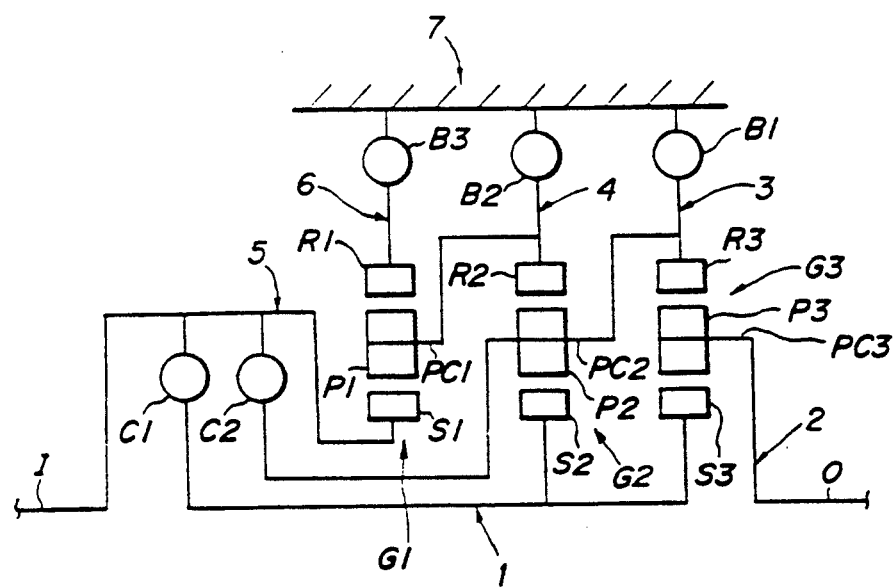
FIG. 1 is a schematic diagram showing the prior art conventional planetary gear type transmission mechanism.
Figure 2:
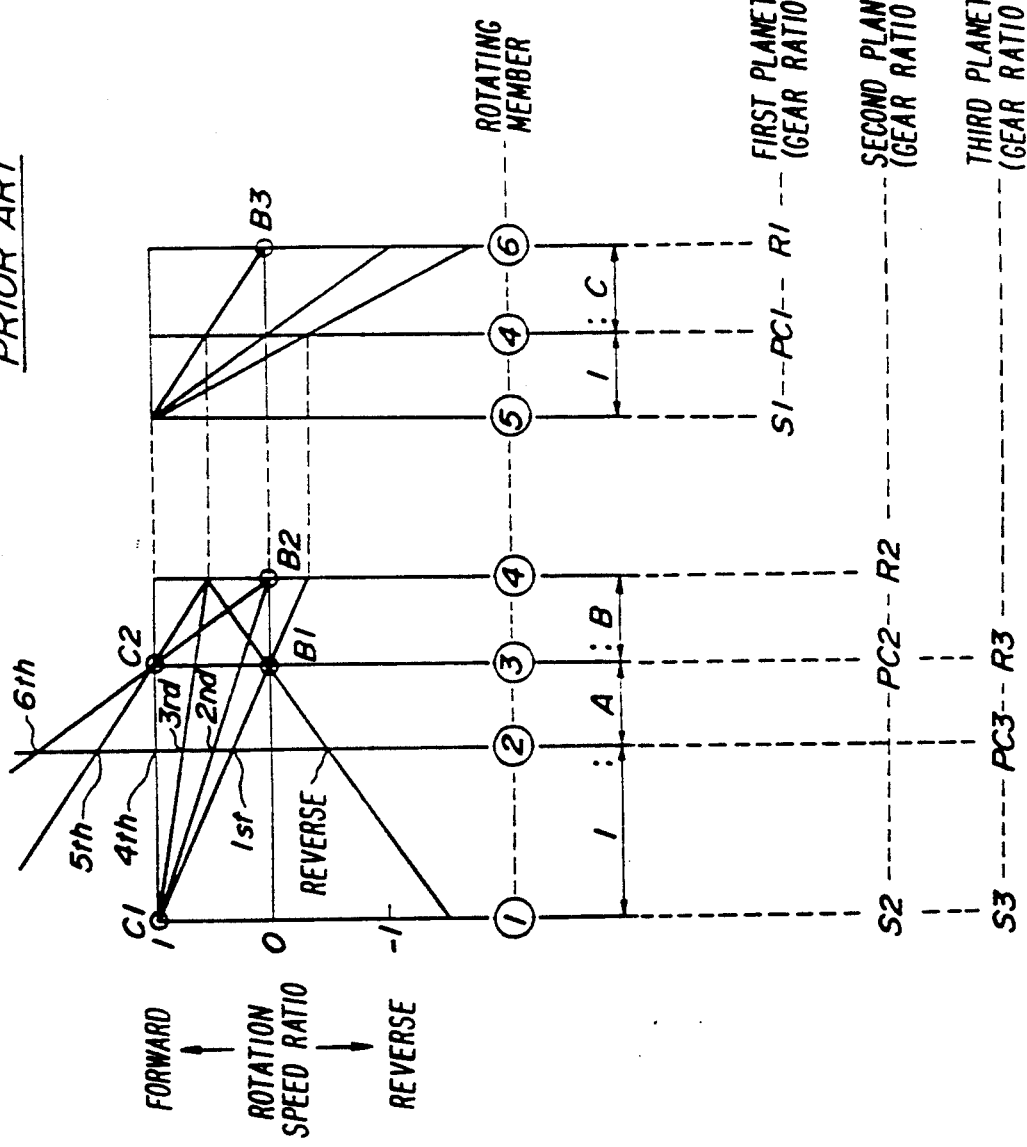
FIG. 2 is an alignment chart showing relationships among rotation speed ratios of various rotating members of the prior art transmission mechanism per FIG. 1.

According to the construction set forth above, similarly to the prior art discussed in the preamble with respect to FIGS. 1 and 2, six forward gear positions and a reverse gear position can be established as shown in the foregoing Table 1 by selectively engaging (refer to "◯" marks in the Table 1) of the friction elements, i.e. clutches C1 and C2 and the brakes B1, B2 and B3.

Though it is not shown in the Table 1, when all friction elements are held in the released or disengaged conditions, a neutral gear position is established, in which the rotation of the input shaft I is never transmitted to the output shaft O. Practically, when the first clutch C1 and the first brake B1 are engaged with maintaining other friction elements in disengaged condition, the first gear position of lowermost speed ratio is established. Similarly, when the first clutch C1 and the second brake B2 are engaged, the second gear position of higher speed ratio is established. When the first clutch C1 and the third brake B3 are engaged, the third gear position of higher speed ratio is established. Also, when the first and second clutches C1 and C2 are engaged, the fourth gear position of higher speed ratio is established. By engaging the second clutch C2 and the third brake B3, the fifth gear position of higher speed ratio can be established. Also, by engaging the second and third brakes B2 and B3, the sixth gear position of highest speed ratio is established. When, the first and third brakes B1 and B3 are engaged, the reverse gear position can be selected. In the practical operation, the first brake B1 is held engaged at the neutral position so that the first gear position and reverse gear position can be selected solely by engaging the first clutch C1 or the third brake B3.

Figure 6:
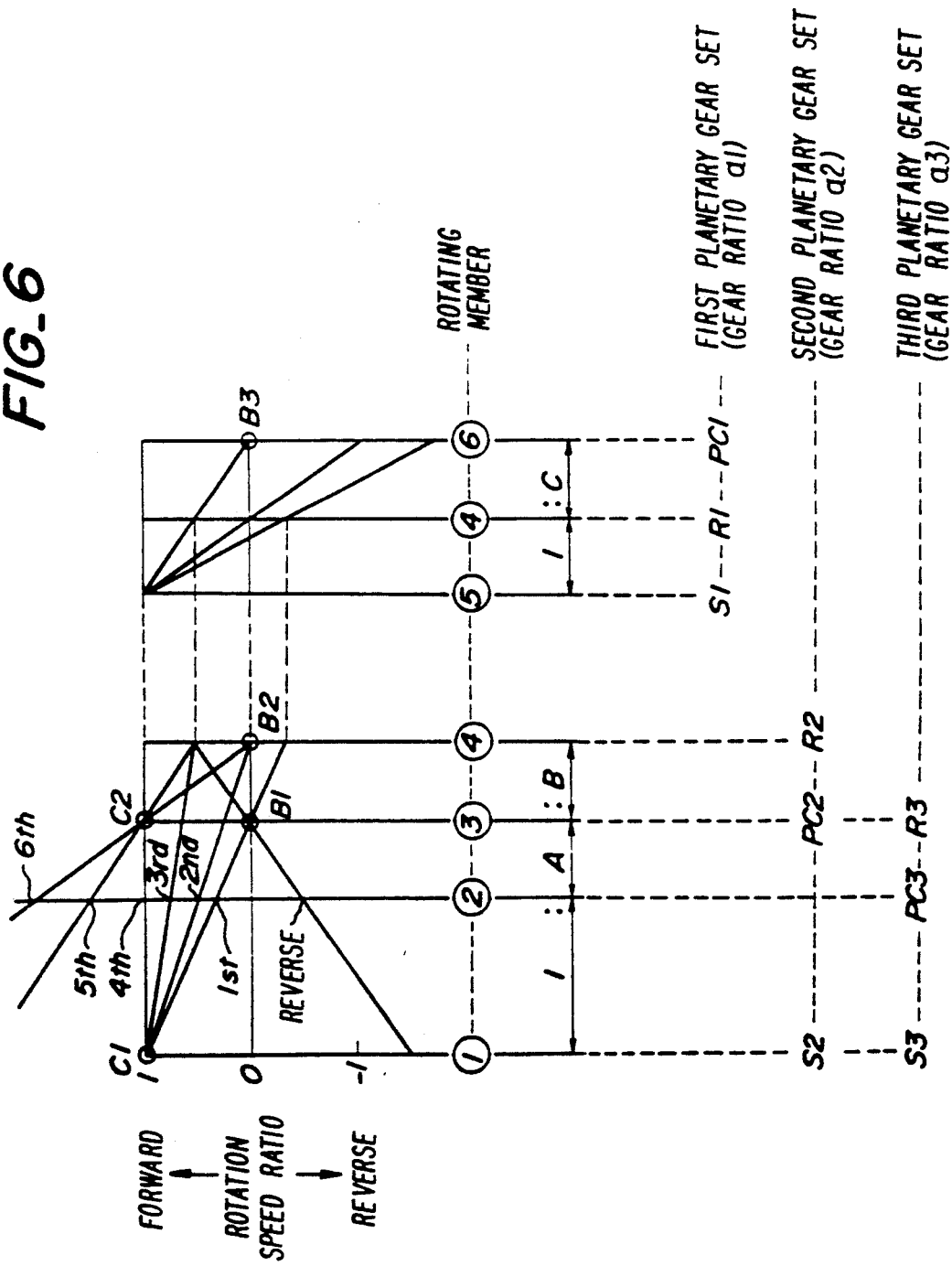
FIG. 6 is an alignment chart showing relationship among rotation speed ratios of various rotating members of the t mechanism in FIG. 5.

Anyhow, the alignment chart of the first embodiment of the planetary gear type transmission mechanism is illustrated in FIG. 6. It should be noted that the alignment chart of the first embodiment is similar to the alignment chart in FIG. 2 of the prior art conventional embodiment shown in FIG. 1. In FIG. 6, the positions 1 to 6 on the horizontal axis show relative position of the first to sixth rotating members determined corresponding to the set gear ratios of the planetary gear sets. If, similarly to the prior art, a rate of the distances between 1 and 2:2 and 3:3 and 4 is 1:A:B, and a rate of the distances between 5 and 4:4 and 6, is 1:C, the gear ratios $\alpha_1$, $\alpha_2$ and $\alpha_3$ of the first, second and third planetary gear sets G1, G2 and G3 can be expressed respectively by:

$$\alpha_1 = C \div (1+C) \tag{1}'$$

$$\alpha_2 = B \div (1+A) \tag{2}$$

$$\alpha_3 = A \tag{3}$$

and the speed ratio of each gear position is same as that in the conventional art which is shown in foregoing Table 1.

Analyzing in more detail, the first embodiment is the same as the conventional art in the alignment chart and in number and arrangement of the frictional elements, so that the speed ratio of each gear position is also same as that in the conventional art as stated above. The gear ratios $\alpha_1$, $\alpha_2$ and $\alpha_3$ of the first, second and third planetary gear sets G1, G2 and G3, however, can be distinguished from that in the conventional art in spite of same speed ratio at each gear position, since one (G1) of the planetary gear sets is altered from single pinion type construction to double pinion type construction. Explaining concretely with use of said example of figures, when the automatic transmission is designed with setting A=0.420, B=0.682 and C=0.887 to establish following speed ratios, first gear position=3.38, the second gear position=1.91, the third gear position=1.34, the fourth gear position=1.00, the fifth gear position=0.75 and sixth gear position=0.62 and the reverse gear position=−3.45, the gear ratios $\alpha_1$, $\alpha_2$ and $\alpha_3$ calculated from the foregoing equations (1)', (2) and (3) as functions of A, B and C are respectively $\alpha_1$=0.470, $\alpha_2$=0.48 and $\alpha_3$=0.42. As can be appreciated, these values are within the preferred range (0.35 to 0.6) for practical use in a planetary gear set. Therefore, it can be appreciated that the shown embodiment make it possible to realize the gear ratio which cannot be realized in the prior art due to lack of durability of the planetary gear set. As a result of this, the shown embodiment provides greater freedom in selection of the speed ratio in the multi-speed ratio automatic transmission.

Figure 7:
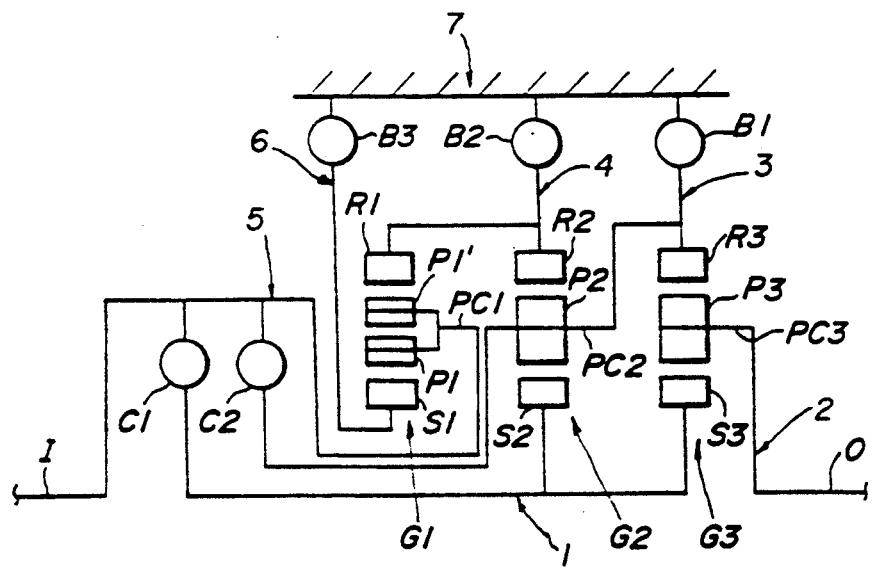
FIG. 7 is a schematic diagram showing the second embodiment of a planetary gear type transmission mechanism according to the invention.

FIG. 7 is a schematic diagram showing the second embodiment of the planetary gear type transmission mechanism according to the invention. Also in this embodiment, the first planetary gear set G1 comprises a double pinion type construction similarly to the foregoing first embodiment. However, in the second embodiment, relationship of connections or the rotating members is modified from that in the first embodiment. Namely, in the second embodiment, the first pinion carrier PC1 is rigidly connected to the input shaft I, in place of the sun gear S1, to form the fifth rotating member 5. On the other hand, the sun gear S1 in the second embodiment serves as the sixth rotating member 6 in place of the pinion carrier PC1, which is selectively fixed to the transmission casing as the seventh member 7 by means of the third brake B3 as the fifth friction element.

Figure 8:
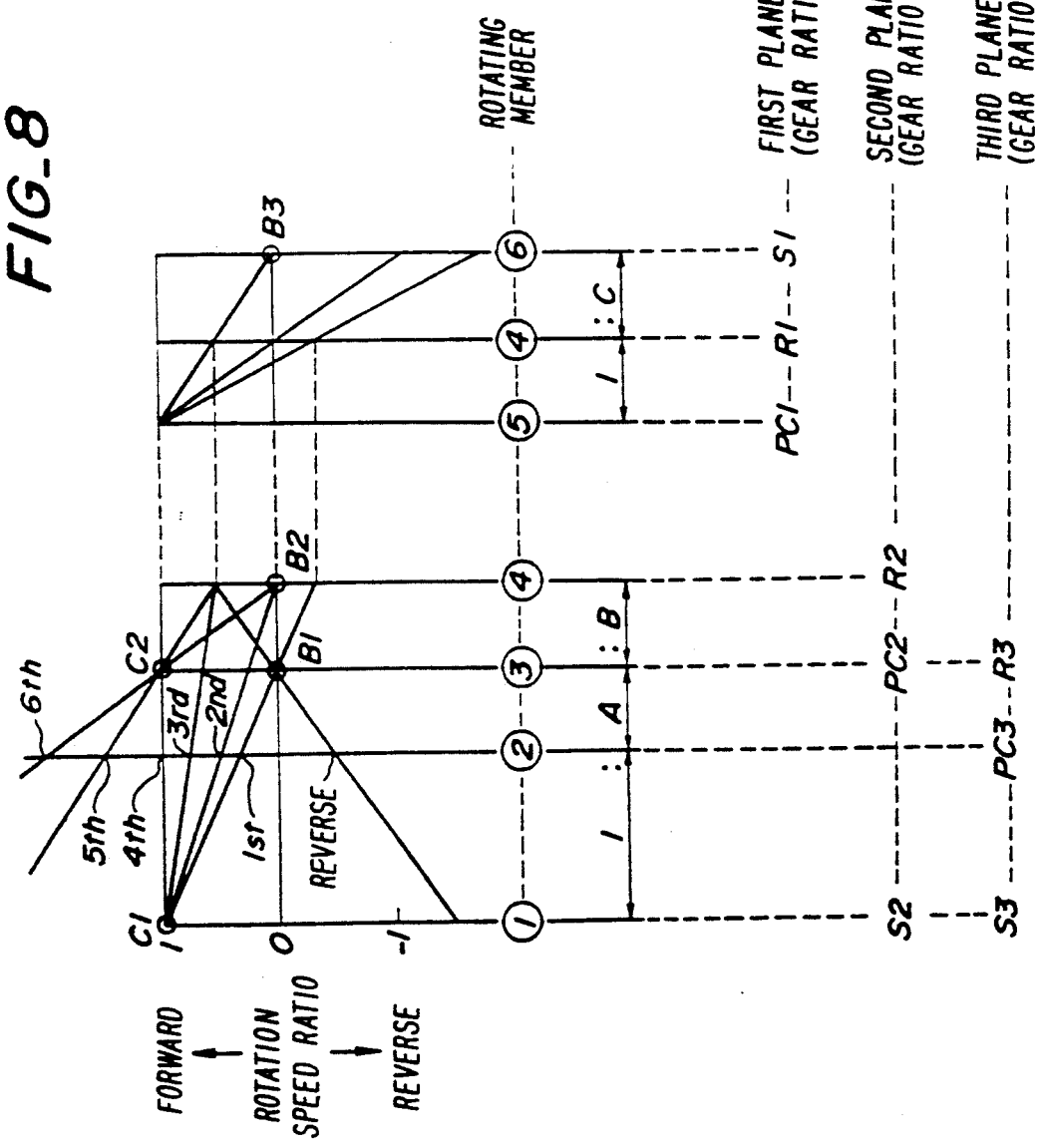
FIG. 8 is an alignment chart showing relationship among rotation speed ratios of various rotating members of the transmission mechanism in FIG. 7.

FIG. 8 shows an alignment chart of the above second embodiment of the planetary gear type transmission mechanism of FIG. 7. As can be appreciated, the alignment chart in FIG. 8 is essentially the same as that in the prior art and the foregoing first embodiment. Therefore, the speed ratio as shown in the foregoing Table 1 can be obtained. In this case, because of the above difference of connections for the rotating members relative to the first planetary gear set G1, the gear ratios $\alpha_1$, $\alpha_2$ and $\alpha_3$ can be expressed by $$\alpha_1 = 1 \div (1+C) \quad (1)''$$

$$\alpha_2 = B \div (1+A) \quad (2)$$

$$\alpha_3 = A \quad (3)$$

and the speed ratio of each gear position is same as that in the conventional art which is shown in foregoing Table 1.

Explaining concretely with use of said example of figures, the gear ratios $\alpha_1$, $\alpha_2$ and $\alpha_3$ calculated from the above equations (1)'', (2) and (3) respectively $\alpha_1$=0.530, $\alpha_2$=0.48 and $\alpha_3$=0.42. Therefore, all gear ratios are maintained within the foregoing preferred range (0.35 to 0.6) for practical use. As a result, the same functional effects can be obtained similarly to the foregoing first embodiment.

Figure 9:
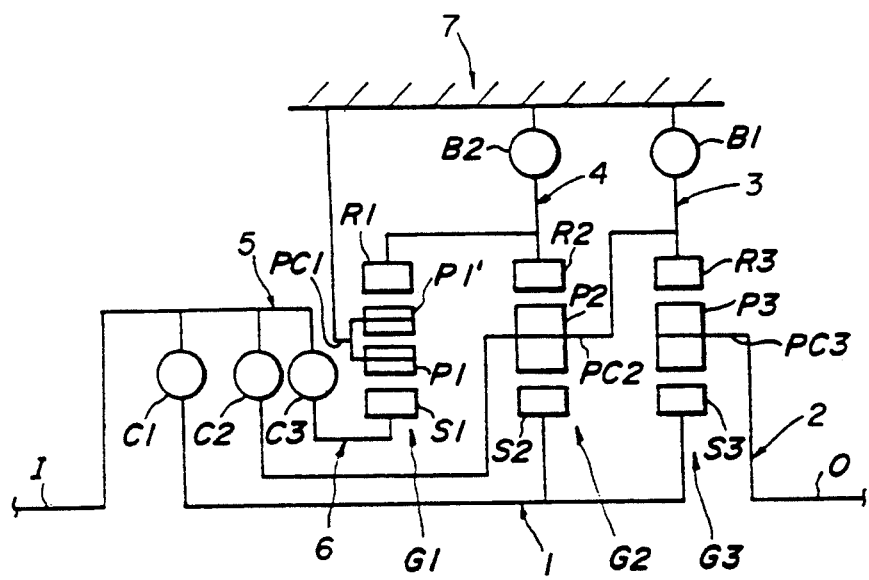
FIG. 9 is a schematic diagram showing the third embodiment of a planetary gear type transmission mechanism according to the invention.
Figure 10:
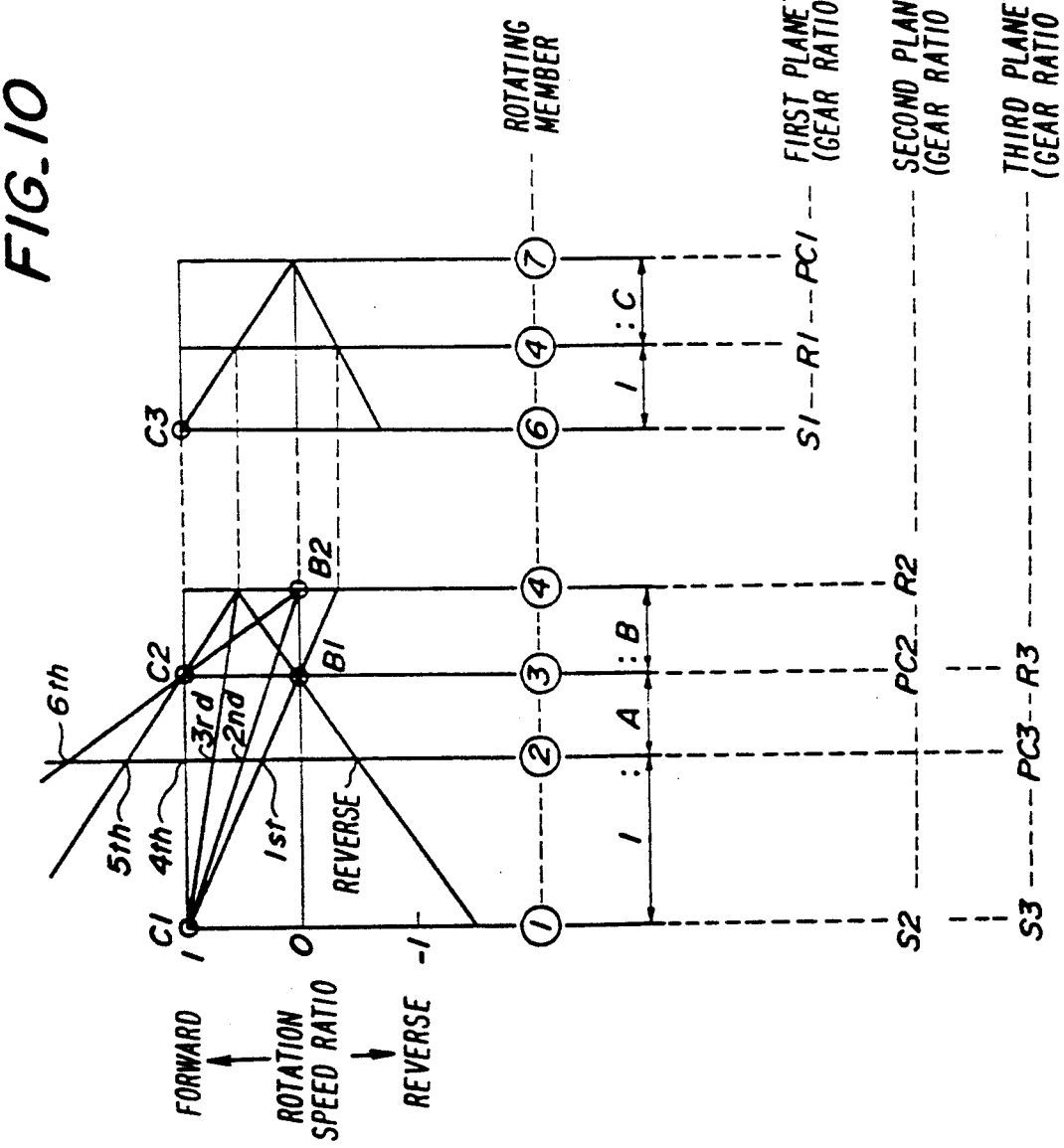
FIG. 10 is an alignment chart showing relationship among rotation speed ratios of various rotating members of the transmission mechanism in FIG. 9.

FIG. 9 is a schematic diagram of the third embodiment of the planetary gear type transmission mechanism according to the invention. FIG. 10 shows an alignment chart of the third embodiment in FIG. 5. The shown embodiment is designed by making similar modification relative to the prior art of FIG. 3.

Figure 3:
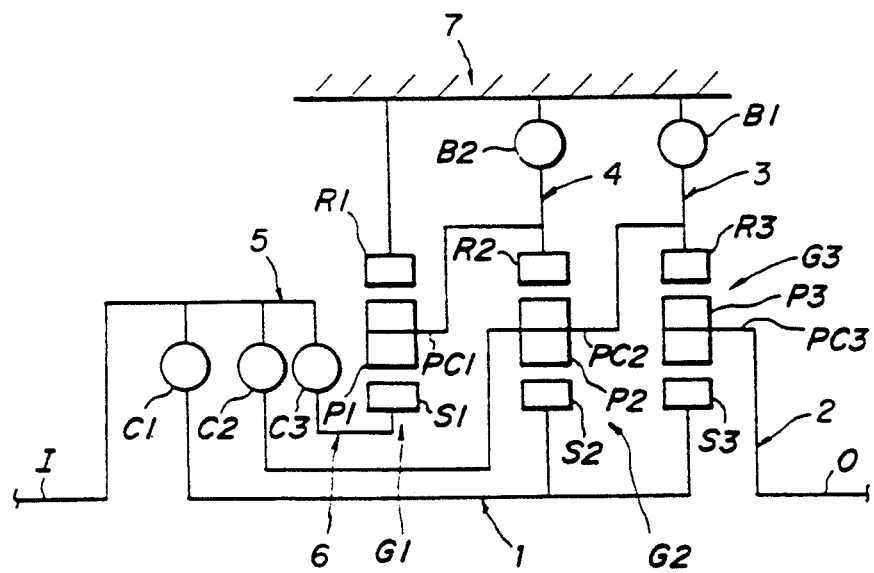
FIG. 3 is a schematic diagram showing another type of the prior art conventional planetary gear type transmission mechanism.

In the third embodiment of FIG. 9, the first planetary gear set G1 is modified to be a double pinion type construction in place of the single pinion type construction in FIG. 3. In this embodiment, the fourth rotating member 4 is formed by the internal ring gears R1 and R2 integrally coupled with each other. Also, the pinion carrier PC1 is fixed to the transmission casing as the seventh member 7.

Figure 4:
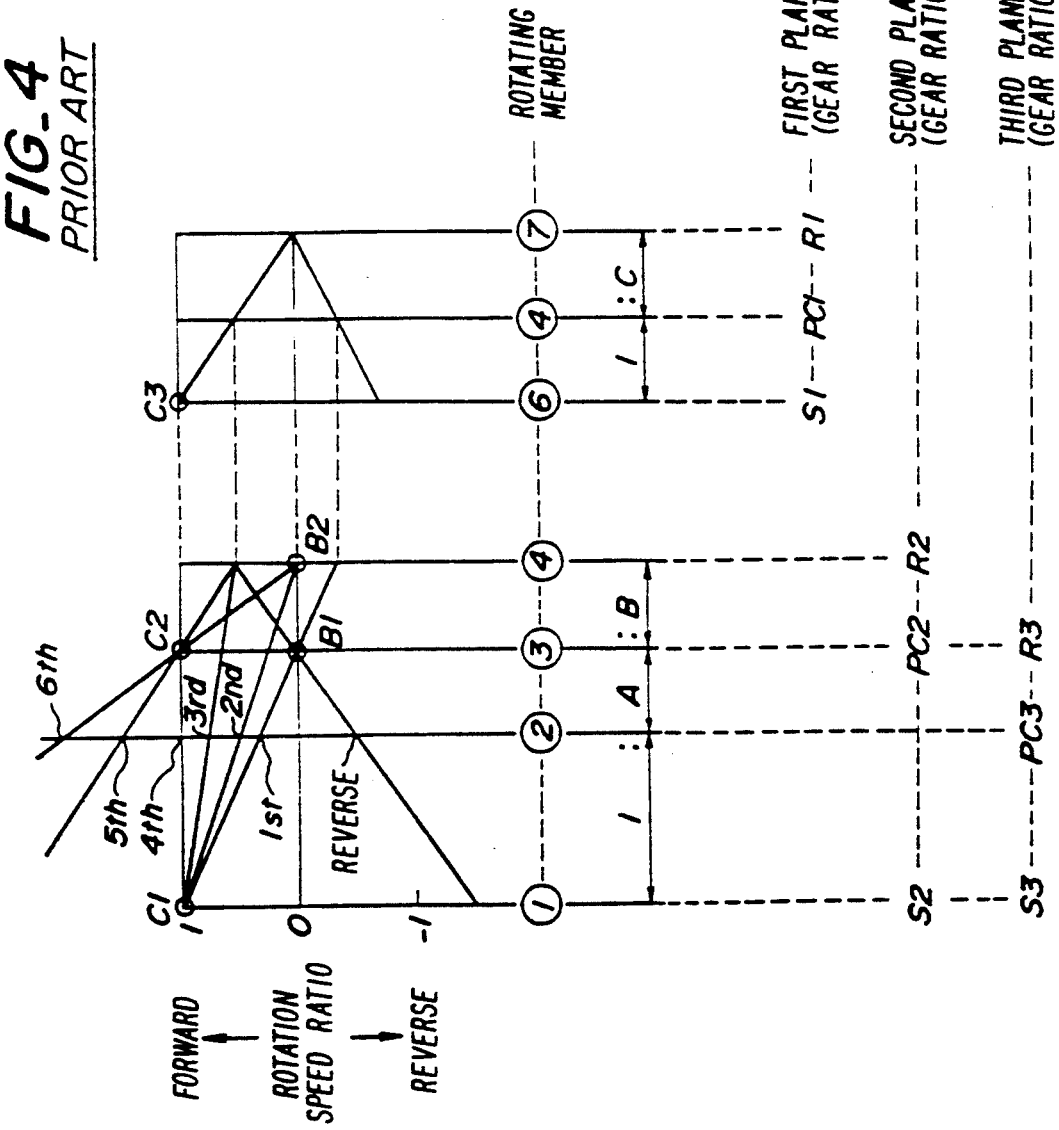
FIG. 4 is an alignment chart showing relationships among rotation speed ratios of various rotating members of the prior art transmission mechanism in FIG. 3.

As can be seen from FIG. 10, the alignment chart of the third embodiment is substantially the same as that in FIG. 4 of the prior art in FIG. 3. Therefore, the speed ratios shown in the foregoing Table 2 can be obtained at respective gear positions. In this case, the gear ratios $\alpha_1$, $\alpha_2$ and $\alpha_3$ can be expressed by the foregoing equations (1)', (2) and (3) due to the arrangement of rotating members relative to the planetary gear set G1, and these gear ratios are similar to the foregoing first embodiment. Therefore the same speed ratio as that in the first embodiment is established, at each gear position, while all of the gear ratios of the planetary gear sets can be maintained within the preferred range similarly to the first embodiment.

FIG. 11 is a schematic diagram of the fourth embodiment of the planetary gear type transmission mechanism according to the invention and FIG. 12 is an alignment chart thereof. The fourth embodiment is designed by alternating connections of the sun gear S1 and the pinion carrier PC1 in the third embodiment. In this case, the pinion carrier PC1 forms the sixth rotating member 6 which is connected and disconnected to the fifth rotating member 5 by means of the third clutch C3 as the fifth friction element. Also, the sun gear S1 is rigidly fixed to the transmission casing as the seventh member 7.

Therefore, the shown embodiment has an alignment chart in FIG. 12 similar to that of the first embodiment and achieves the speed ratios at respective gear positions shown in the foregoing Table 2. In this case, the gear ratios $\alpha_1$, $\alpha_2$ and $\alpha_3$ can be expressed by said equations (1)'', (2) and (3) similarly to the foregoing second embodiment. Therefore, all of the gear ratios can be maintained within the preferred range for practice use, upon designing an automatic transmission of said speed ratios.

As set forth above with respect to each embodiment, according to the present invention, the planetary gear type transmission mechanism for establishing desired speed ratios at a plurality of gear positions, replaces one of a plurality of the planetary gear sets by the double pinion type planetary gear set, to enable the gear ratios of all of the planetary gear sets to be maintained within a preferred range for practical use. Therefore, the present invention can provide greater freedom in selecting the speed ratios upon designing the automatic transmission.

In this disclosure, there are shown and described only the preferred embodiments of the invention, but, as aforementioned, it is to be understood that the invention is capable of use in various other combinations and environments and is capable of changes or modifications within the scope of the invention concept as expressed herein.

What is claimed is:

1. An improved planetary gear type transmission mechanism, for example for an automatic transmission comprising an input shaft, an output shaft, planetary gear sets interposed coaxially between the input and output shafts respectively and adapted to provide a plurality of speed ratios therebetween and friction elements selectively operative to establish said plurality of speed ratios, the improvement comprising:

a first planetary gear set of a double pinion type construction, near the input shaft and including a first sun gear, a first internal ring gear, a pair of first planet pinions and a fixed first pinion carrier;

a second planetary gear set is a single pinion type construction, including a second sun gear, a second internal ring gear, a second planet pinion and a second pinion carrier; and a third planetary gear set near the output shaft and also of a single pinion type construction, including a third sun gear, a third internal ring gear, a third planet pinion and a third pinion carrier;

wherein said first, second and third planetary gear sets cooperate so as to provide a first member with said second sun gear and said third sun gear integrally coupled with each other, a second member with said output shaft and said third pinion carrier rigidly fixed thereto, a third member with said second pinion carrier and said third internal ring gear integrally coupled with each other, a fourth member with said first internal ring gear and said second internal ring gear integrally coupled with each other, a fifth member with said input shaft;

a sixth member with said first sun gear and a seventh member with a transmission casing, and said friction elements include a first friction element selectively connecting and disconnecting said first member and said fifth member, a second friction element selectively fixing and releasing said third member to and from said seventh member, a third friction element selectively connecting and disconnecting said third member and said fifth member, a fourth friction element selectively fixing and releasing said fourth member to and from said seventh member and a fifth friction element selectively connecting and disconnecting said fifth member and said sixth member.

2. An improved planetary gear type transmission mechanism, for example for an automatic transmission comprising an input shaft, an output shaft, planetary gear sets interposed coaxially between the input and output shafts respectively and adapted to provide a plurality of speed ratios therebetween and friction elements selectively operative to establish said plurality of speed ratios, the improvement comprising:

a first planetary gear set of a double pinion type construction, near the input shaft and including a fixed first sun gear, a first internal ring gear, a pair of first planet pinions and a first pinion carrier;

a second planetary gear st of a single pinion type construction, including a second sun gear, a second internal ring gear, a second planet pinion and a second pinion carrier; and a third planetary gear set near the output shaft and also of a single pinion type construction, including a third sun gear, a third internal ring gear, a third planet pinion and a third pinion carrier;

wherein said first, second and third planetary gear sets cooperate so as to provide a first member with said second sun gear and said third sun gear integrally coupled with each other, a second member with said output shaft and said third pinion carrier rigidly fixed thereto, a third member with said second pinion carrier and said third internal ring gear integrally coupled with each other, a fourth member with said first internal ring gear and said second internal ring gear integrally coupled with each other, a fifth member with said input shaft a sixth member with said first pinion carrier and a seventh member with a transmission casing, and said friction elements include a first friction element selectively connecting and disconnecting said first member and said fifth member, a second friction element selectively fixing and releasing said third member to and from said seventh member, a third friction element selectively connecting and disconnecting said third member and said fifth member, a fourth friction element selectively fixing and releasing said fourth member to and from said seventh member and a fifth friction element selectively connecting and disconnecting said fifth member and said sixth member.

* * * * *